Oct. 3, 1950     M. G. CLAY     2,524,189
HOOK STRUCTURE
Filed June 10, 1946     2 Sheets-Sheet 1
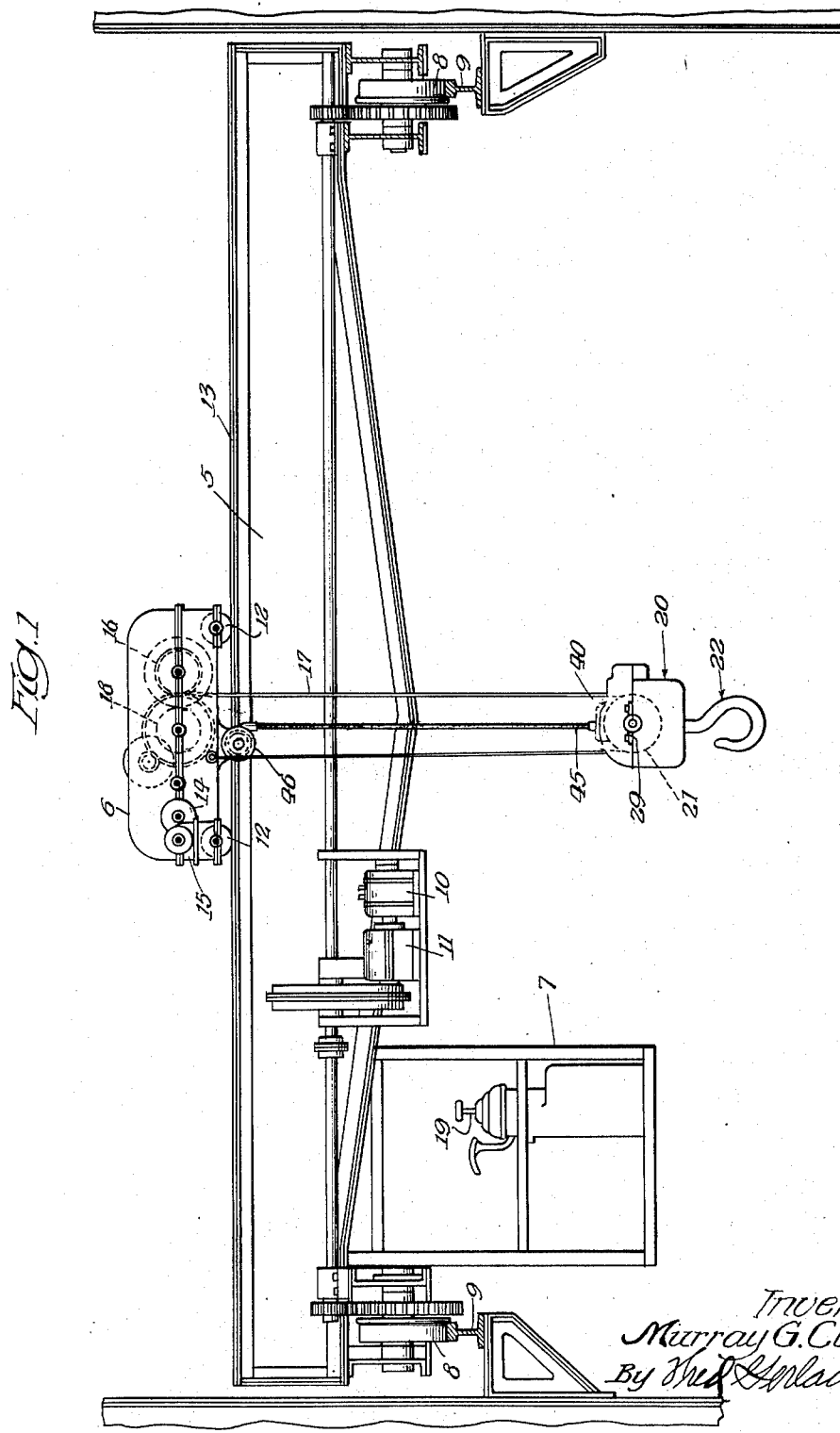
Inventor
Murray G. Clay

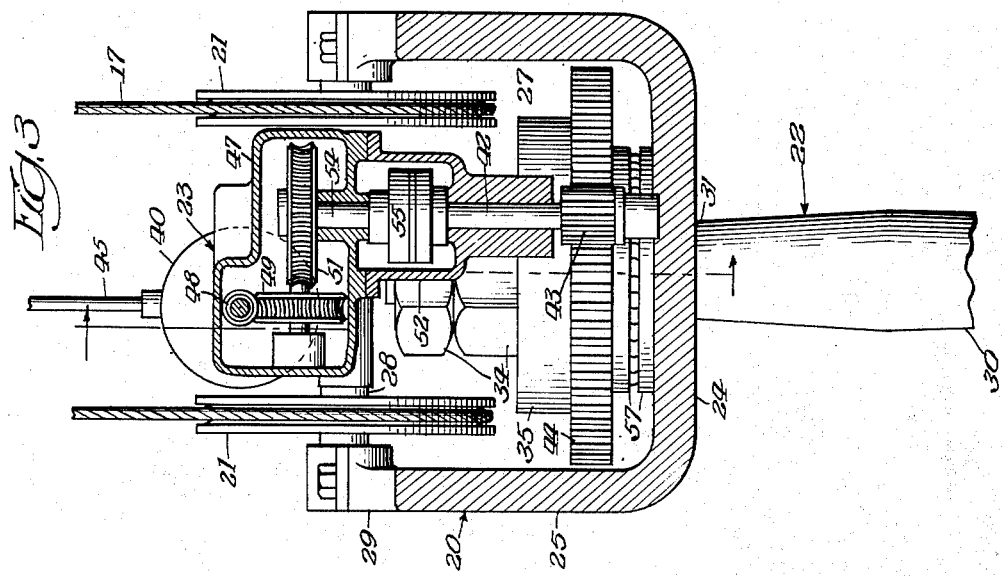

Patented Oct. 3, 1950

2,524,189

UNITED STATES PATENT OFFICE 2,524,189

HOOK STRUCTURE

Murray G. Clay, River Forest, Ill.

Application June 10, 1946, Serial No. 675,602

5 Claims. (Cl. 294—82)

The present invention relates generally to hook structures. More particularly the invention relates to that type of hook structure which is used in connection with, and forms the load raising and lowering instrumentality of, a hoisting apparatus, such, for example, as an overhead crane, and comprises a block which carries or supports a plurality of vertically extending sheaves together with a depending hook and is supported from above by way of a flexible cable system that is trained or reeved around the sheaves.

One object of the invention is to provide a hook structure of this type which is an improvement upon, and has certain inherent advantages over, previously designed hook structures for the same purpose and is characterized by the fact that the hook is mounted rotatably with respect to the block and has associated with it novel reversible power mechanism whereby it may be rotated in either direction to the end that the operator of the hoisting apparatus of which the hook structure forms a part may angularly adjust to any desired extent the load that is supported by the hook, or may turn or rotate the hook when empty in order to align it with load connection means, such as a bail or lifting ring, without manual assistance.

Another object of the invention is to provide a hook structure of the aforementioned character in which the speed reducing gearing constituting part of the power mechanism for rotating the hook comprises a horizontal gear that extends loosely around the shank part of the hook, and the driving connection between the speed reducing gearing and the hook comprises a collar which is fixedly connected to the shank part of the hook, rests upon and engages frictionally the gear and forms a slip type friction drive whereby twisting of the cable is automatically prevented or precluded in connection with operation of the hook rotating mechanism regardless of the magnitude of the load on the hook.

A further object of the invention is to provide a hook structure which is generally of new and improved construction, effectively and efficiently fulfills its intended purpose and is capable of being produced and operated at a comparatively low cost.

Other objects of the invention and the various advantages and characteristics of the present hook structure will be apparent from a consideration of the following detailed description.

The invention consists in the several novel features which are hereinafter set forth and are more particularly defined by the claims at the conclusion hereof.

In the drawings which accompany and form a part of this specification or disclosure and in which like numerals of reference denote corresponding parts throughout the several views:

Figure 1 is a side elevation of an overhead crane having applied thereto, and as a part thereof, a hook structure embodying the invention;

Figure 2 is an enlarged vertical section of the hook structure; and

Figure 3 is a vertical section on the line 3—3 of Figure 2.

The hook structure which is shown in the drawings constitutes the preferred form or embodiment of the invention. It is adapted for use in connection with, and serves as the load raising and lowering instrumentality of, any type or variety of hoisting apparatus, such, for example, as the overhead crane of Figure 1. Such crane is of conventional design or construction and comprises an elongated horizontally extending bridge 5, a carriage 6, and an operator's cab 7. The bridge is supported at its ends by wheels 8 which are adapted to travel on a pair of horizontally extending, parallel, laterally spaced rails 9 in order that the bridge is permitted to travel back and forth in a direction at right angles to its length. Mechanism in the form of an electric motor 10 and speed reducing gearing 11 serves to effect lateral shift or travel of the bridge in either direction. The carriage 6 has wheels 12 which are supported on a pair of parallel, laterally spaced, longitudinally extending rails 13 on the bridge and coact with such rails to permit the carriage to move back and forth lengthwise of the bridge. Mechanism in the form of an electric motor 14 and speed reducing gearing 15 is mounted on the carriage 6 and serves to propel the carriage in either direction along the rails 13. A rotary motor driven hoisting drum 16 is mounted on the carriage 6 and operates through the medium of a pair of side by side cables 17 to effect raising and lowering of the hook structure. Certain ends of the cables are anchored to the carriage and the other ends are connected to, and extend around, the hoisting drum 16. The central portions of the cables are in the form of depending loops. When the hoisting drum is rotated in one direction it serves to wind up the cables and effect raising of the hook structure and when the hoisting drum is reversely rotated it operates to pay out the cables and effect lowering of the hook structure. The operator's cab 7 is connected to, and depends from one end of, the bridge and, as well understood in the art, carries a controller for actuating the mechanism for propelling the carriage 6, and a controller for effecting actuation of the motor driven hoisting drum 16. If desired the three controllers may be connected together for selective or conjoint operation by way of a single upstanding control element 19 like that shown in United States Letters Patent No. 2,391,881, granted to me on January 1, 1946.

As its components parts the hook structure comprises a block 20, a pair of sheaves 21, a hook 22 and reversible power mechanism 23 for rotating the hook relatively to the block.

The block 20 is preferably in the form of a one-piece casting and comprises a bottom wall 24, a pair of opposed upstanding side walls 25 and a pair of opposed upstanding side walls 26 at right angles to the side walls 25. The side walls 25 and 26 define an open top compartment 27 and have the lower or bottom wall 24 of the block. The sheaves 21 are rotatively mounted on the end portions of a horizontally extending shaft 28 and, as shown in Figures 2 and 3 of the drawings, are disposed in laterally spaced relation and directly adjacent the inner surfaces of the block side walls 25. The bottom portions of the two loops constituting the central portions of the cables 17 are trained or reeved around the sheaves, respectively. The end extremities of the shaft 28 are mounted in supporting member 29 which are disposed on the upper central portions of the side walls 25 of the block 20. As heretofore pointed out, when the cables 17 are taken up by the motor operated hoisting drum 16 the hook structure is raised and when the cables are paid out the structure is lowered.

The hook 22 is adapted to be connected to a load to be moved from place to place by the overhead crane and consists of a C-shaped hook part 30 and an upstanding shank part 31. The shank part is connected to the upper leg of the hook part and extends into the central portion of the compartment 27 in the block 20 by way of a circular hole 32 in the central portion of the block bottom wall 24. It is journalled in a bearing 33 and has mounted on the upper end thereof a pair of nuts 34 and a collar 35. The bearing 33 fits within the circular hole 32 and embodies at its upper end an outwardly extending annular flange 36 which rests on the upper end of a vertically extending sleeve-like part 37. As shown in Figure 2, such part is formed integrally with, and projects upwards from, the hole defining portion of the bottom wall 24 of the block 20. The nuts 34 are mounted on a male screw thread 38 on the upper end of the hook shank part 31. They overlie the collar 35 and serve to hold the hook 22 against downward displacement with respect to the collar. The collar is preferably formed of steel, and is fixedly connected to the shank part of the hook by way of a key 39. By reason of the fact that the shank part of the hook is journalled in the bearing 32 the hook is permitted to rotate or swivel without limit.

The power mechanism 23 for rotating the hook is mounted on the block 20 and comprises a reversible electric motor 40, a speed reducing unit 41, a shaft 42, a pinion 43 and a gear 44. The electric motor is located between the two sheaves 21 and overlies the central portion of the shaft 28. It is supplied with current by way of a flexible conductor 45 and is arranged so that the armature shaft thereof extends horizontally. The upper end of the conductor 45 is connected to, and wound around, a spring retracted reel 46 in order that the conductor is automatically paid out in connection with lowering of the hook structure and is wound or taken up during raising of the structure. As shown in Figure 1, the reel 46 is mounted on the crane carriage 6 and is disposed beneath the hoisting drum 16. As a result of the fact that the conductor 45 has its upper end applied to the reel 46 it is always taut regardless of the level at which the hook structure is disposed. The speed reducing unit 41 comprises a housing 47, a worm 48, a worm gear 49, a worm 50 and a worm gear 51. The housing 47 is located over one of the side walls 26 of the block 20 and is secured to such side wall by way of a pair of brackets 52. As shown in Figure 2, the casing of the reversible electric motor 40 is connected to the housing 47 of the speed reducing unit 41, and one end of the armature shaft projects into the housing. The housing 47 serves as a mount for the electric motor 40 and maintains the motor in fixed or rigid relation with respect to the block 20 of the hook structure. The worms and worm gears of the unit 41 are disposed within the housing 47. The worm 48 is mounted on, and fixedly connected to, the end of the armature shaft of the electric motor that projects into the housing. The worm gear 49 is mounted on a horizontally extending shaft 53 and meshes with, and is driven by, the worm 48. The worm 50 is mounted on the shaft 53. The worm gear 51 is mounted on the upper end of a vertically extending shaft 54 and meshes with, and is driven by, the worm 50. The shaft 54 extends downwards through the housing 47, overlies and is in coaxial relation with the vertically extending shaft 42 and is connected to the upper end of said shaft 42 by way of a coupling 55. The shaft 42 is journalled in a bearing 56 on the adjacent side wall 26 of the block 20. The pinion 43 is mounted on, and fixedly secured to, the lower end of the shaft 42 and meshes with and serves to drive the gear 44. Said gear is preferably formed of bronze, extends loosely around the central portion of the shank part 31 of the hook 22, and underlies, and is in frictional engagement with, the collar 35. A ball bearing variety thrust bearing 57 is interposed between the gear 44 and the block bottom wall 24 and serves to hold the gear against downward displacement with respect to the block 20. The lower race of the bearing surrounds the sleeve-like part 37 and the upper race is in direct engagement with the bottom surface of the gear. The collar 35 and the gear 44 form a slip type friction drive between the reversible power mechanism and the hook 22. The magnitude of the load on the hook determines the amount of friction between the collar 35 and the gear 44 and thus the driving force that is imparted to the hook by the mechanism 23 is proportional to the load with the result that regardless of the magnitude of the load there is no twisting of the cables in connection with operation or drive of the power mechanism. When the mechanism 23 is driven in one direction the hook 22 is caused to rotate in one direction with respect to the block 20 and when the mechanism is driven in the opposite direction the hook is caused reversely to rotate with respect to the block. By operating the mechanism 23 in one direction or the other the operator of the crane may angularly adjust the hook and load to any desired extent.

The reversible electric motor 40 of the power mechanism 23 is controlled by way of a reversing switch (not shown). Such switch is in associated relation with the crane control element 19 on the operator's cab 7 and is suitably electrically connected to the conductor 45 which, as previously pointed out, leads from the spring retracted reel 46 on the crane carriage 6 to the reversible electric motor 40. A rotating handle 58 on the upper end of the control element 19 serves to control the reversing switch. When the handle is turned in one direction the switch operates so to control the motor 40 that it is driven in one direction and when the handle is reversely rotated it operates so to control the switch that the motor 40 is driven or operated in the opposite direction. If desired, spring means (not shown) may be employed to urge the handle 58 into a neutral position.

When it is desired to use the hook structure to transport a load from one place to another it is lowered and then applied to the load by way of a chain, sling, or other connecting instrumentality. After connection of the hook structure to the load it is raised and then shifted to the desired place by proper control of the bridge and carriage of the crane. By rotating or turning the hook 22 in one direction or the other with respect to the block 20 the load may be angularly adjusted as desired or the operator, when the hook is empty, may turn the hook so as properly to position it for application to load connection means without manual assistance. As heretofore pointed out, when the power mechanism 23 is driven in one direction it operates to rotate or turn the hook in one direction and when the mechanism is reversely operated it operates to turn or rotate the hook in the opposite direction.

The herein described hook structure effectively and efficiently fulfills its intended purpose and is characterized by the fact that the operator may rotate or turn the hook and load into any desired angular position with respect to the block 20. By reason of the fact that the structure includes a slip type friction drive between the power mechanism 23 and the hook and the driving force is proportional to the load on the hook there is no possibility in connection with operation of the mechanism for the cables 17 to twist, regardless of the magnitude of the load on the hook. Because the reversible power mechanism 23 is mounted directly on the block 20 the hook structure as a whole is of unitary character.

Whereas the hook structure has been described and illustrated in connection with an overhead travelling crane it is to be understood that it may be used in connection with any other form or variety of hoisting apparatus. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A hook structure adapted for use in connection with a hoisting apparatus with a hoist cable in the form of a depending loop, and comprising a block provided with a sheave for receiving the lower portion of the cable loop, a hook depending from the block and connected to the latter so that it is rotatable about a substantially vertical axis, and power mechanism for rotating the hook, mounted on the block and embodying an electric motor, speed reducing gearing connected to the motor and a slip type friction drive between the speed reducing gearing and the hook.

2. A hook structure adapted for use in connection with a hoisting apparatus with a hoist cable in the form of a depending loop, and comprising a block provided with a sheave for receiving the lower portion of the cable loop, a load receiving and supporting hook depending from the block and provided with an upstanding shank extending upwards through, and rotatably mounted in, the lower portion of the block and provided at its upper end with a fixed collar, and power mechanism for rotating the hook relatively to the block mounted on said block and embodying a driven member extending loosely around the hook shank and underlying and frictionally engaging the collar.

3. A hook structure adapted for use in connection with a hoisting apparatus with a hoist cable in the form of a depending loop, and comprising a block provided with a sheave for receiving the lower portion of the cable loop, a load receiving and supporting hook depending from the block and provided with an upstanding shank extending upwards through, and rotatably mounted in, the lower portion of the block and provided at its upper end with a fixed collar, and power mechanism for rotating the hook relatively to the block mounted on said block and embodying a prime mover and speed reducing gearing connected for drive by the prime mover and including a gear extending loosely around the hook shank and underlying and frictionally engaging the collar.

4. A hook structure adapted for use in connection with a hoisting apparatus with a hoist cable in the form of a depending loop, and comprising a block provided with a sheave for receiving the lower portion of the cable loop, a load receiving and supporting hook depending from the block and provided with an upstanding shank extending upwards through, and rotatably mounted in, the lower portion of the block and provided at its upper end with a fixed collar, power mechanism for rotating the hook relatively to the block mounted on said block and embodying a driven member extending loosely around the hook shank and underlying and frictionally engaging the collar, and a thrust bearing interposed between the member and said bottom portion of the block.

5. A hook structure adapted for use in connection with a hoisting apparatus with a hoist cable in the form of a depending loop, and comprising a block provided with a sheave for receiving the lower portion of the cable loop, a load receiving and supporting hook depending from the block and provided with an upstanding shank extending upwards through, and rotatably mounted in, the lower portion of the block and provided at its upper end with a fixed collar, power mechanism for rotating the hook relatively to the block mounted on said block and embodying a prime mover and speed reducing gearing connected for drive by the prime mover and including a gear extending loosely around the hook shank and underlying and frictionally engaging the collar, and a ball type thrust bearing interposed between the gear and said bottom portion of the block.

MURRAY G. CLAY.

REFERENCES CITED

The following references are of record in the file of this patent:

UNITED STATES PATENTS

| Number | Name | Date |
|---|---|---|
| 429,404 | Andrews et al. | June 3, 1890 |
| 1,343,107 | Barath | June 8, 1920 |
| 1,577,283 | Mitchell | Mar. 16, 1926 |
| 2,303,002 | Ruddock | Nov. 24, 1942 |
| 2,391,881 | Clay | Jan. 1, 1946 |